United States Patent
Diaz Fuente

(10) Patent No.: US 7,627,054 B2
(45) Date of Patent: Dec. 1, 2009

(54) DEVICE AND METHOD FOR IMPROVING THE SIGNAL TO NOISE RATIO BY MEANS OF COMPLEMENTARY SEQUENCES

(75) Inventor: Vicente Diaz Fuente, Pedro Sarmiento de Gamboa, 3, 2°B, 28805 Alcala de Henares, Madrid (ES)

(73) Assignee: Vicente Diaz Fuente, Madrid (ES)

( * ) Notice: Subject to any disclaimer, the term of this patent is extended or adjusted under 35 U.S.C. 154(b) by 509 days.

(21) Appl. No.: 10/832,128

(22) Filed: Apr. 26, 2004

(65) Prior Publication Data
US 2005/0238112 A1    Oct. 27, 2005

(51) Int. Cl.
*H04B 15/00* (2006.01)
(52) U.S. Cl. .................. 375/285; 375/260; 375/343; 375/346; 375/348
(58) Field of Classification Search .............. 375/285, 375/260, 343, 346, 348
See application file for complete search history.

(56) References Cited

U.S. PATENT DOCUMENTS

| | | | | |
|---|---|---|---|---|
| 3,751,596 A | * | 8/1973 | Tseng | 370/203 |
| 6,048,315 A | | 4/2000 | Chiao et al. | |
| 6,567,482 B1 | | 5/2003 | Popovic | |
| 6,567,842 B2 | * | 5/2003 | De Leo et al. | 709/200 |
| 2004/0058701 A1 | * | 3/2004 | Jung et al. | 455/522 |

* cited by examiner

*Primary Examiner*—Ted M Wang
(74) *Attorney, Agent, or Firm*—Gottlieb, Rackman & Reisman

(57) ABSTRACT

A device and method for improving the signal to noise ratio by means of complementary sequences, consisting of the use of M complementary sets of sequences, understanding complementary as the sums of their autocorrelations, resulting in a Krönecker delta, the M value coinciding with the number of complementary sets of sequences which are orthogonal to one another, understanding by orthogonal that the sum of the cross-correlations of the complementary sequences of each set is zero.

6 Claims, 3 Drawing Sheets

US 7,627,054 B2

DEVICE AND METHOD FOR IMPROVING THE SIGNAL TO NOISE RATIO BY MEANS OF COMPLEMENTARY SEQUENCES

OBJECT OF THE INVENTION

The present specification refers to a patent of invention application corresponding to a device and method for improving the signal to noise ratio by means of complementary sequences, the evident purpose of which lies in being configured as an encoding and decoding method, as well as the encoder and decoder, which allow the transmission and reception of data through any transmission or storage means, particularly when it is necessary or desirable to reduce the transmission power, to improve the signal to noise ratio in reception and even to encipher the transmitted or stored information.

FIELD OF THE INVENTION

This invention is applicable within the telecommunications industry.

BACKGROUND OF THE INVENTION

The efficiency of a communication system is basically determined by the bandwidth used and the signal to noise ratio in the receiver according to the expression formulated by Claud Elwood Shannon in 1948:

$$C = B\log_2\left(1 + \frac{P_s}{N_s}\right)(\text{bits/sec}) \quad (1)$$

Increasing the bandwidth entails using a resource which is becoming more and more scarce due to the considerable number of telecommunication services that society demands. The only factor we can alter is the signal to noise in reception, $$\frac{P_s}{N_s}.$$

It is not desirable to increase the transmission power, Ps, since the consumption of the equipment must be as reduced as possible, especially in mobile equipment. Therefore, the only element susceptible to being reduced is the noise power in the receiver. Most noise reduction techniques make use of the statistical properties of the noise to be considered.

Generally, although not always, the noise with which communications systems are modeled is the Gaussian white noise, the spectral power density of which is constant along the entire spectrum of interest. Gaussian white noise is generally associated to the noise temperature or noise factor of the electronic devices used in reception. Generally, the noise is modeled as the noise produced by an equivalent noise resistance (R), in a bandwidth (B) and at the working temperature (T) in Kelvin degrees. In other words:

$$N_0 = kTBR \text{ watts} \quad (2)$$

where K is the Boltzman constant.

The term noise density in watts per hertz for a 1 ohm resistance is generally used.

One of the most effective techniques for improving the Signal to Noise Ratio (SNR) of a communication system is called the matched filter.

Said technique allows optimizing the SNR assuming that the noise is Gaussian noise. The most significant case is the use of digital encoding systems of the symbols transmitted by means of sequences whose autocorrelation function is as similar as possible to a Krönecker delta. The use of Barker, Willard, Gold, Kasami and Walsh sequences, and many others, has become widespread for this purpose in the majority of the current applications. Thus, the length of the sequences used N allows increasing the signal to noise ratio or reducing the signal level to correctly detect the signal received. This improvement factor is called Process Gain Gp, and can be expressed by:

$$GP = 10 \log_{10}(N) \text{ dB}. \quad (3)$$

The drawback of this technique is that since each symbol is encoded by a sequence of length N, the bits of which are transmitted at N times the symbol speed, the symbol speed is reduced as the length of the sequences used increases. If it is necessary to maintain the transmission speed, the bandwidth transmitted must be increased, due to which the spectral efficiency of the system decreases with N. In the event that the noise is not Gaussian noise, matched filtering is not the best solution. The techniques for reducing different types of noise will depend on the application and on the features of the communication system.

Based on the foregoing, it can be deduced that there is a necessity for a technique which allows reducing noise without reducing the transmission speed nor increasing the bandwidth used, allowing maintaining, at the same time, the transmitted power and independently from the modulation system used.

Likewise, in numerous applications, a certain degree of privacy is necessary, the complementary sequences are extremely complex to decipher by analytical methods due to their non-reducible sequence quality, due to which at the same time that the signal to noise ratio is improved, it is possible to encipher the information before transmitting it or storing it, and to decipher it in the later reception or reading.

The existence of any patent or utility model having features which are the object of the present invention is not known.

EXPLANATION OF THE INVENTION

The invention presented herein uses M complementary sets of sequences. By complementary, it is understood that the sum of their autocorrelations results in a Krönecker delta. The value of M also coincides with the number of complementary sets of sequences which are orthogonal to one another. By orthogonal, it is understood that the sum of the cross-correlations of the complementary sequences of each set is zero. In the particular case of pairs (M=2) of orthogonal sequences, they receive the name of Golay sequences in honor of their discoverer. (These concepts are discussed in the article published by Tseng, C.-C. and Liu, C. L.: "Complementary Sets of Sequences", en IEEE Trans. Inform. Theory, vol. IT-18, No. 5, pp. 644-652, September 1972.). The explanation will be focused on the Golay sequences, since it is the simplest case, although the patent extends to any value for M.

The main property of the sequences used in this invention is that they have an ideal autocorrelation feature, i.e. it corresponds to a perfect Krönecker delta such that they comply with:

$$\phi_{11}[n] + \phi_{22}[n] + \ldots + \phi_{MM}[n] = \sum_{i=1}^{M} \phi_{ii}[n] = \begin{cases} MN, & n = 0 \\ 0, & n \neq 0 \end{cases} \quad (4)$$

where $\phi_{ii}$ are the individual autocorrelations of each one of the chosen M complementary sequences of length N. Particu larized for the case of Golay pairs of complementary sequences:

$$\phi_{II}[n] + \phi_{QQ}[n] = \begin{cases} 2N, & n = 0 \\ 0, & n \neq 0 \end{cases} \quad (5)$$

The generation of such sequences is carried out from the so-called basic 2, 10 and 26 bit kernels known to date (the rules for generating Golay sequences are discussed in the article entitled "Complementary Sequences" of M. J. E. Golay, published in IRE Transactions on Information Theory, vol. IT-7, pp. 82-87, April, 1961).

When inserted in a conventional communication equipment, the encoding and decoding system object of the present invention allows improving the signal to noise ratio (SNR) according to the length of the complementary sequences used. Thus, it allows controlling the quality of the system by controlling the length of said sequences.

It consists of two equipments or apparatuses: an encoder and a decoder.

The encoding equipment is in charge of carrying out the following tasks:
  Sampling the transmitter baseband signals, generated by the modulation system, using at least two phases.
  Convoluting each one of the phases with a selected complementary set of sequences orthogonal to the rest of the phases.
  Carrying out the sum of the different phases to form each one of the new encoded phases.
  Sending to the transmitter the composite signal so that it is emitted to the transmission means by means of, for example, an RF stage and antenna.

The decoding equipment is in charge of carrying out the following tasks:
  Sampling the receiver baseband signals, generated by the demodulation system, using at least two phases.
  Correlating the different phases with the complementary set of sequences corresponding to each one of the phases to recover.
  Carrying out the sum of the different flows extracted to form each one of the new decoded phases.

To be able to explain the theoretical base of the invention, it is suitable to use a block diagram of the process (FIG. 1). To simplify, assume a modulation system having two baseband phases $I_1$ and $Q_1$ and two Golay orthogonal pairs of complementary sequences ($A_1/B_1$-$A_2/B_2$) of length N are used. As discussed, the encoding process begins with blocks 2.1 and 2.2 (see FIG. 2), in which the following operation is carried out:

$$I_{21}[n] = \sum_{k=-\infty}^{\infty} I_1[n-k]A_1[k]; \quad Q_{21}[n] = \sum_{k=-\infty}^{\infty} I_1[n-k]B_1[k] \quad (6)$$

$$I_{22}[n] = \sum_{k=-\infty}^{\infty} Q_1[n-k]A_2[k]; \quad Q_{22}[n] = \sum_{k=-\infty}^{\infty} Q_1[n-k]B_2[k]$$

The final process consists of adding the I and Q components of all the phases (in this case two) obtaining the expressions:

$$I_2[n] = I_{21}[n] + I_{22}[n]$$

$$Q_2[n] = Q_{21}[n] + Q_{22}[n] \quad (7)$$

Replacing in (6), $$I_2[n] = \sum_{k=-\infty}^{\infty} I_1[n-k]A_1[k] + \sum_{k=-\infty}^{\infty} Q_1[n-k]A_2[k] \quad (8)$$

$$Q_2[n] = \sum_{k=-\infty}^{\infty} I_1[n-k]B_1[k] + \sum_{k=-\infty}^{\infty} Q_1[n-k]B_2[k]$$

The obtained signals $I_2[n]$ and $Q_2[n]$ will be modulated and transmitted through the means h[n] and will reach the receiver with additive noise. Therefore, once demodulated, in reception the obtained signals will be the following:

$$I'_2[n] = \sum_{k=-\infty}^{\infty} I_2[n-k]h[k] + n[n] \quad (9)$$

$$Q'_2[n] = \sum_{k=-\infty}^{\infty} Q_2[n-k]h[k] + n[n]$$

Assuming that the input processes are ergodic, the decoding block processes the input signals $I'_2[n]$ and $Q'_2[n]$ to obtain the original estimated signals by means of the correlation operation, according to the following expression:

$$I'_1[n] = \phi_{I'_2 A_1}[n] + \phi_{Q'_2 B_1}[n] \quad (10)$$

$$= \frac{1}{N}\sum_{j=0}^{N-1} I'_2[j]A_1[j-n] + \frac{1}{N}\sum_{j=0}^{N-1} Q'_2[j]B_1[j-n]$$

$$= \langle I'_2[j]A_1[j-n]\rangle_N + \langle Q'_2[j]B_1[j-n]\rangle_N$$

$$Q'_1[n] = \phi_{I'_2 A_2}[n] + \phi_{Q'_2 B_2}[n]$$

$$= \frac{1}{N}\sum_{j=0}^{N-1} I'_2[j]A_2[j-n] + \frac{1}{N}\sum_{j=0}^{N-1} Q'_2[j]B_2[j-n]$$

$$= \langle I'_2[j]A_2[j-n]\rangle_N + \langle Q'_2[j]B_2[j-n]\rangle_N$$

where $$\langle x[j]\rangle_N = \frac{1}{N}\sum_{j=0}^{N-1} x[j]$$

is the temporal mean extended to N samples. Replacing, $$I'_1[n] = \left\langle \left(\sum_{k=-\infty}^{\infty} I_2[j-k]h[k] + n[j]\right)A_1[j-n]\right\rangle_N + \quad (11)$$

$$\left\langle \left(\sum_{k=-\infty}^{\infty} Q_2[n-k]h[k] + n[n]\right)B_1[j-n]\right\rangle_N$$

$$Q'_1[n] = \left\langle \left(\sum_{k=-\infty}^{\infty} I_2[j-k]h[k] + n[j]\right)A_2[j-n]\right\rangle_N + $$

$$\left\langle \left(\sum_{k=-\infty}^{\infty} Q_2[n-k]h[k] + n[n]\right)B_2[j-n]\right\rangle_N$$

Replacing $I_2$, $$I'_1[n] = \left\langle \left(\sum_{k=-\infty}^{\infty}\left[\sum_{k=-\infty}^{\infty} I_1[j-k]A_1[k] + \sum_{k=-\infty}^{\infty} Q_1[j-k]A_2[k]\right]h[k] + n[j]\right)A_1[j-n]\right\rangle_N + \left\langle \left(\sum_{k=-\infty}^{\infty}\left[\sum_{k=-\infty}^{\infty} I_1[j-k]B_1[k] + \sum_{k=-\infty}^{\infty} Q_1[j-k]B_2[k]\right]h[k] + n[n]\right)B_1[j-n]\right\rangle_N \quad (12)$$

and $Q_2$, $$Q'_1[n] = \left\langle \left(\sum_{k=-\infty}^{\infty}\left[\sum_{k=-\infty}^{\infty} I_1[j-k]A_1[k] + \sum_{k=-\infty}^{\infty} Q_1[j-k]A_2[k]\right]h[k] + n[j]\right)A_2[j-n]\right\rangle_N + \left\langle \left(\sum_{k=-\infty}^{\infty}\left[\sum_{k=-\infty}^{\infty} I_1[j-k]B_1[k] + \sum_{k=-\infty}^{\infty} Q_1[j-k]B_2[k]\right]h[k] + n[n]\right)B_2[j-n]\right\rangle_N \quad (13)$$

And identifying terms:

$$I'_1[n] = \langle x_I[n]\phi_{A_1A_1}\rangle_N + \langle x_Q[n]\phi_{A_2A_1}\rangle_N + \langle x_I[n]\phi_{B_1B_1}\rangle_N + \langle x_Q[n]\phi_{B_2B_1}\rangle_N + \langle n[n]A_1[n]\rangle_N + \langle n[n]B_1[n]\rangle_N$$

$$Q'_1[n] = \langle x_I[n]\phi_{A_1A_2}\rangle_N + \langle x_Q[n]\phi_{A_2A_2}\rangle_N + \langle x_I[n]\phi_{B_1B_2}\rangle_N + \langle x_Q[n]\phi_{B_2B_2}\rangle_N + \langle n[n]A_2[n]\rangle_N + \langle n[n]B_2[n]\rangle_N \quad (14)$$

Where $x_I[n]$ and $x_Q[n]$ are the signals received without noise:

$$x_I[n] = \sum_{k=-\infty}^{\infty} I_1[n-k]h[k] \quad (15)$$

$$x_Q[n] = \sum_{k=-\infty}^{\infty} Q_1[n-k]h[k]$$

and the correlation expressions are:

$$\phi_{K_iL_j[N]} = \frac{1}{N}\sum_{k=0}^{N-1} K_i[k+n]L_j[n]/K, L \in A, B \quad (16)$$

Knowing that the sum of the cross-correlations are nil, the following is obtained:

$$I'_1[n] = \langle x_I[n]\phi_{A_1A_1}\rangle_N + \langle x_I[n]\phi_{B_1B_1}\rangle_N + \langle n[n]A_1[n]\rangle_N + \langle n[n]B_1[n]\rangle_N$$

$$Q'_1[n] = \langle x_Q[n]\phi_{A_2A_2}\rangle_N + \langle x_Q[n]\phi_{B_2B_2}\rangle_N + \langle n[n]A_2[n]\rangle_N + \langle n[n]B_2[n]\rangle_N \quad (17)$$

Therefore, replacing for the definition of the mean for N and knowing that the sum of the autocorrelations is a Krönecker delta, $2N\delta[n] = \phi_{A_iA_i}[n] + \phi_{B_iB_i}[n]$, the following expressions are obtained:

$$I'_1[n] = 2x_I[n] + \frac{1}{N}\sum_{j=0}^{N-1} n[n](A_1[j-n] + B_1[j-n]) \quad (18)$$

-continued $$Q'_1[n] = 2x_Q[n] + \frac{1}{N}\sum_{j=0}^{N-1} n[n](A_2[j-n] + B_2[j-n])$$

Comparing the previous expression with that of a conventional communications system, the system is identical, except in the noise expression, which now corresponds to the sum of the cross-correlations of the noise with the complementary sequences. By applying Fourier transforms and the properties of the complementary sequences, assuming that the signals are real, the previous expression is expressed in the frequency:

$$I'_1(\omega) = 2I_1(\omega)H(\omega) + \frac{N(\omega)}{N}[A_1(\omega) + B_1(\omega)] \quad (19)$$

$$I'_1(\omega) = 2Q_1(\omega)H(\omega) + \frac{N(\omega)}{N}[A_2(\omega) + B_2(\omega)]$$

In the previous expression, it can be appreciated that the result of the system is made up of the response to the impulse $H(\omega)$ plus a noise term. The main advantage of this method is found by analyzing the second term of expression (18). Knowing that for a process with a nil mean, as is the case, the mean power is equal to zero autocorrelation:

$$\sigma_{x_I}^2 = \phi_{x_Ix_I}[0]$$

$$\sigma_{x_Q}^2 = \phi_{x_Qx_Q}[0] \quad (20)$$

By calculating the mean powers of expression (17) and normalizing the transmitted power, it can be written in the following manner:

$$\sigma_{I'_1}^2 = \phi_{I'_1I'_1}[0] = \phi_{x_Ix_I}[0] + \frac{\sigma_n^2}{4N^2}[\phi_{A_1A_1}[0] + \phi_{B_1B_1}[0]] \quad (21)$$

$$\sigma_{Q'_1}^2 = \phi_{IQ'_1Q'_1}[0] = \phi_{x_Ix_Q}[0] + \frac{\sigma_n^2}{4N^2}[\phi_{A_2A_2}[0] + \phi_{B_2B_2}[0]]$$

By applying the autocorrelation properties, it results in a total mean power of:

$$\sigma_{I_1'}^2 = \phi_{I_1'I_1'}[0] = \phi_{x_{I_1}x_I}[0] + \frac{\sigma_n^2}{2N} \quad (22)$$

$$\sigma_{Q_1'}^2 = \phi_{Q_1'Q_1'}[0] = \phi_{x_{Q_I}x_Q}[0] + \frac{\sigma_n^2}{2N}$$

Where $\sigma_n^2$ is the noise power at the system input. This power is reduced by a factor of 2N. For that reason, the signal to noise ratio improves by a factor equal to two times the length of the sequences. This can be translated into the following expression:

$$\Delta N = 2^{-\Delta(S/N)/3} \quad (23)$$

where $\Delta(S/N)$ corresponds to the increase in the desired signal to noise ratio in decibels (dB), and $\Delta N$ corresponds to the increase of the length of the sequences used to obtain said improvement. In other words, if the length of the sequences is doubled, a noise reduction of 3 dB is obtained. Inversely, to obtain a certain signal-noise ratio in dB, the length of the sequence must be increased according to expression (22).

The advantage of this method is that of being able to obtain as great an improvement in the signal to noise ratio as desired, regardless of the transmission speed, and only increasing the length of the chosen complementary sequences, due to which large transmission powers are not necessary for obtaining a high signal to noise ratio in reception.

That improvement, in the general case of complementary sets of sequences, will correspond to a process gain (in decibels), defined in this case as:

$$GP = 10 \log_{10}(NM) \text{ dB} \quad (24)$$

where N corresponds to the length of the complementary sequences used in the modulation and M corresponds to the number of sequences forming each one of the orthogonal sets, furthermore coinciding with the number of orthogonal sets. This feature is very important in applications where low transmission power is desirable (portable terminals, spaceships and communication satellites), where communication is carried out over large distances (transmissions in deep space), and even military applications in which interferences caused by the enemy or the need to encrypt the transmission determine the security and quality of the communication.

Therefore, the invention which is described constitutes a powerful system for improving current and future communications systems when there are restrictions on the transmission power, or simply when it is desired to improve the quality of communications without degrading transmission speed.

DESCRIPTION OF THE DRAWINGS

To complement the description being made and for the purpose of helping to better understand the features of the invention, a set of drawings is attached to the present specification, as an integral part thereof, in which the following has been shown with an illustrative and non-limiting character.

PREFERRED EMBODIMENT OF THE INVENTION

Figure 1:
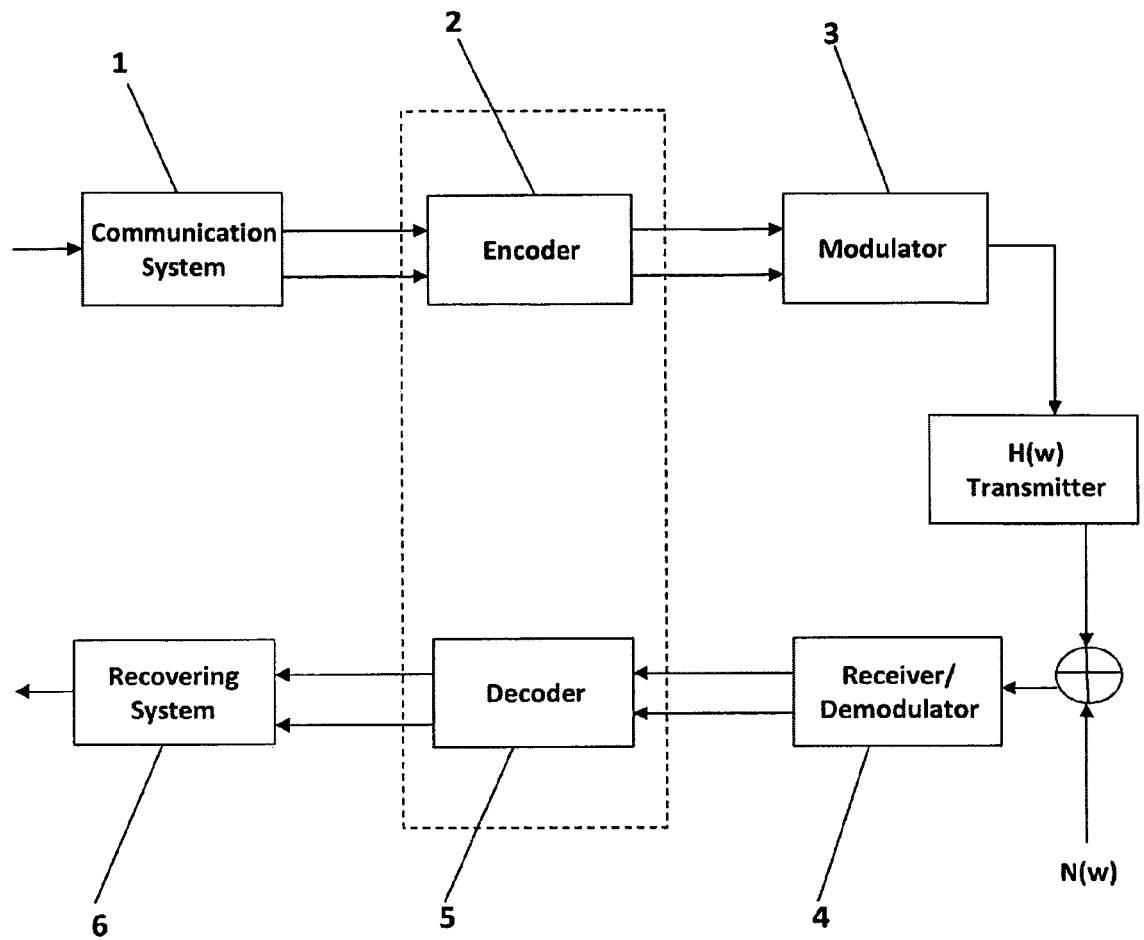
FIG. 1 shows the data to be transmitted, which is baseband modulated by means of any communication system (1).

In view of these figures, the following can be observed:

FIG. 1 shows the data to be transmitted, $D(\omega)$; it is baseband modulated by means of any communication system (1), encoded in (2) by means of orthogonal complementary sequences, of length N, to obtain new baseband signals. Said signals can be modulated (3) to be sent to any transmission means $H(\omega)$. In the receiver (4), the signals with additive noise $N(\omega)$ are demodulated (4) and the baseband signals are extracted with noise. Said signals (5) are decoded using the same orthogonal complementary sequences, such that at the process output, the same original signals with the reduced noise power are recovered according to the length of the sequences used, N, and therefore, data $D'(\omega)$ is recovered in (6) with a reduced error rate.

Figure 2:
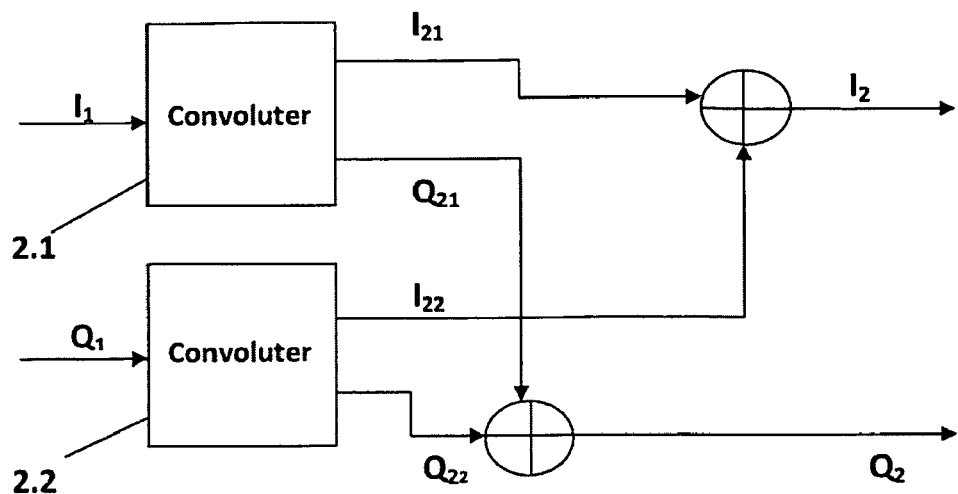
FIG. 2 shows the basic diagram of the encoding method incorporated within block (2) of figure number 1.

FIG. 2 shows the basic diagram of the encoding method found inside block (2) of FIG. 1. It consists of two identical blocks 2.1 and 2.2 which carry out the convolution described in the previous section with the input signal $I_1$ and $Q_1$, respectively. Both blocks obtain two phases, $I_{21}/Q_{21}$ and $I_{22}/Q_{22}$, which are added together to obtain signals $I_2$ and $Q_2$ at their output, which will subsequently be sent to the transmission stage.

Figure 3:
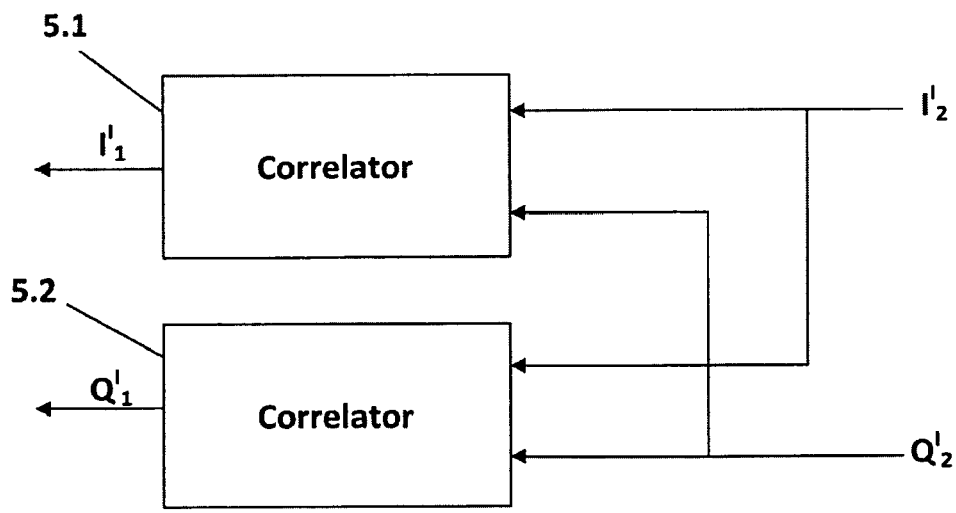
FIG. 3 shows a basic diagram of the internal decoding method of block (5) shown in figure number 1.

FIG. 3 shows a basic diagram of the internal decoding method of block 5 of FIG. 1. There are two identical blocks which carry out the correlation of the input signals with the orthogonal complementary sequences assigned to the transmission signals, obtaining an estimate of the signals transmitted with an improved signal to noise ratio at the output.

Figure 4:
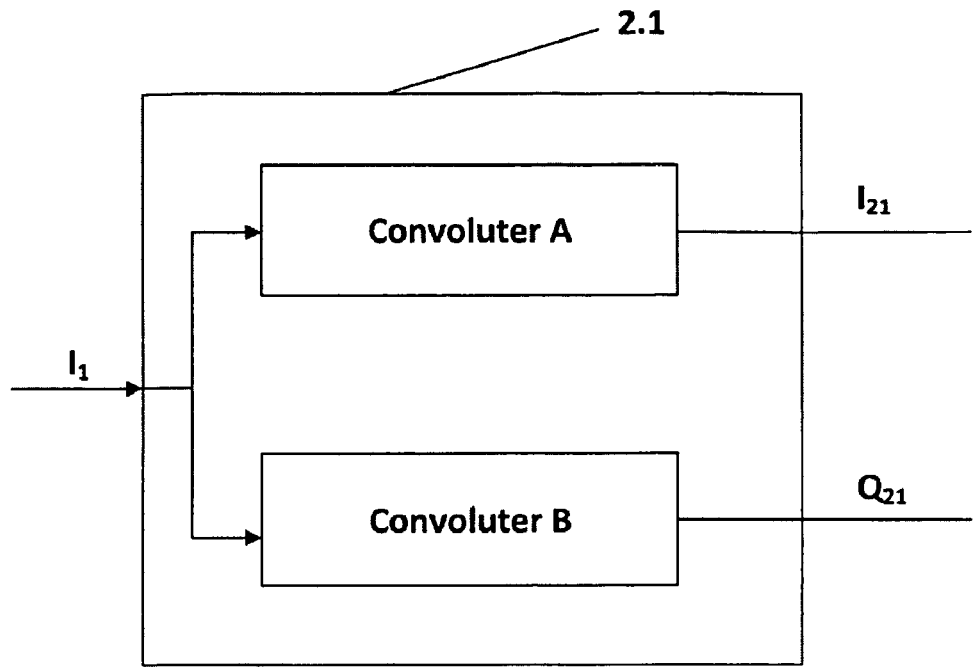
FIG. 4 shows a diagram for carrying out encoder 2.1.

FIG. 4 shows a diagram for carrying out encoder 2.1, which shows the simultaneous convolution process of the input signals with the corresponding sequences A and B for obtaining output signals $I_{2i}/Q_{2i}$, for i the number of the corresponding block. Both blocks are identical, however, as explained throughout the text, the sets of sequences used all comply with the property of being orthogonal to one another.

Figure 5:
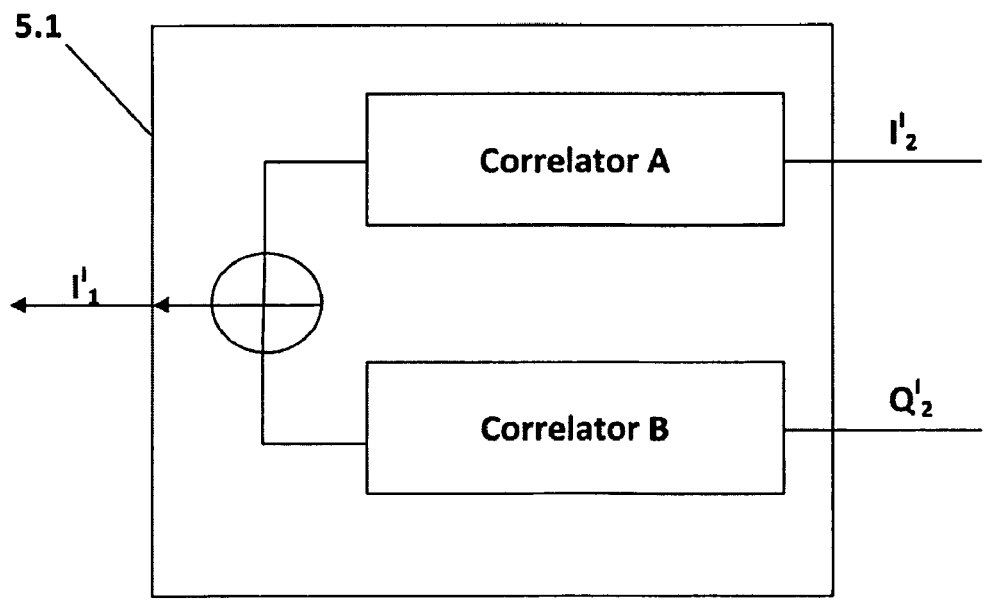
FIG. 5 shows a diagram for carrying out decoder 5.1.

FIG. 5 shows a diagram for carrying out the decoder 5.1; in it, the process for correlating the input signals with the corresponding sequences A and B by means of the interpolation of $(f_s/R)-1$ zeros between samples can be observed. The result of both phases is added together to obtain each one of the recovered phases $I'_1/Q'_1$.

A possible embodiment of this method, applied to a free space radio point to point communication system, is detailed below. For the sake of clarity, the implementation is diagramed in FIG. 1 for the case of a quadrature transmitter, which performs the modulation of the data using two phases I/Q, therefore, two complementary sets of sequences will be necessary, and in this case, Golay complementary sequences will be used for simplicity.

According to that previously explained, this starts from two Golay pairs of complementary sequences ($A_1/B_1$-$A_2/B_2$), of length N bits, previously generated and stored in the transmitter by means of 4 binary registrations (values 1 and −1), which are intended to be convoluted with the samples of input signals $I_1$ y $Q_1$, respectively. In the same FIG. 4, one of the basic encoding blocks (BCB) making up the encoder can also be seen in detail.

The encoder carries out the following tasks, where R is the transmission speed of the original system in symbols/second:

The digital data of the phases I/Q oversampled at least at the Nyquist frequency (2R) are simultaneously converted and convoluted with sequence A and B, and the result is sent to the two outputs corresponding to the sampling frequency. The convolver carries out the convolution operation at the sampling frequency, but the samples of the complementary sequences with which it convolutes are interpolated with m−1 zeros, where m is the number of samples per symbol, and which will depend on the sampling frequency $f_s$ such that $m=f_s/R$.

FIG. 3 shows a detailed diagram of the decoder, which is also formed by two basic decoding blocks (BDB), detailed in FIG. 5. Said identical blocks carry out the following tasks:

The received data $I'_2/Q'_2$ is correlated with the same sequences used in the encoding, with the same zero interpolation level (m−1), such that the outputs of the correlators are added together sample by sample, and thus the replicas of the original transmitted signals $I'_1/Q'_1$ are reconstructed.

Both apparatuses make up the encoding and decoding system.

The invention claimed is:

1. A method of encoding a transmission signal to improve the signal to noise ratios comprising:

separating the transmission signal into a first plurality of substantially orthogonal component signals, each of the first plurality of substantially orthogonal component signals having one of a plurality of phases;

convoluting the first plurality of substantially orthogonal component signals by a convoluter with a selected set of complementary sequences to create a second plurality of substantially orthogonal signals, each of the second plurality of substantially orthogonal signals having a phase corresponding to one of the plurality of phases; and summing each of the second plurality of substantially orthogonal signals having the same phase by an adder, to create a third plurality of substantially orthogonal signals.

2. The method of claim 1, wherein said selected set of complementary sequences are binary sequences.

3. The method of claim 1, wherein said selected set of complementary sequences have autocorrelations resulting in a Kronecker delta.

4. The method of claim 1, wherein the selected set of complementary sequences are Golay orthogonal pairs.

5. A method of transmitting a transmission signal, comprising: encoding the transmission signal, wherein said encoding includes:

separating the transmission signal into a first plurality of substantially orthogonal component signals; each of the first plurality of substantially orthogonal component signals having one of a plurality of phases;

convoluting the first plurality of substantially orthogonal component signals by a convolutor with a selected set of complementary sequences to create a second plurality of substantially orthogonal signals, each of the second plurality of substantially orthogonal signals having a phase corresponding to one of the plurality of phases; and summing each of the second plurality of substantially orthogonal signals having the same phase by an adder, to create a third plurality of substantially orthogonal signals;

modulating the third plurality of signals into a single output;

transmitting said single output over a network;

receiving said single output;

demodulating said single output into a fourth plurality of substantially orthogonal signals, said fourth plurality being of the same number as the first plurality and having phases corresponding to the phases of the first plurality; and decoding said fourth plurality, Wherein said decoding includes;

separating each signal of said fourth plurality into a number of component signals, wherein, the number of component signals corresponds to the number of said complementary signals; and convoluting each of said component signals with an inverse of said selected set of complementary sequences to form a fifth plurality of signals and summing each signal of the fifth plurality of signals having the same phase to create a sixth plurality of signals.

6. An apparatus for encoding a transmission signal to improve the signal to noise ratio, comprising:

a modulator for separating the transmission signal into a first plurality of substantially orthogonal component signals, each of the first plurality of substantially orthogonal component signals having one of a plurality of phases;

a convolute for convoluting the first plurality of substantially orthogonal component signals with a selected set of complementary sequences to create a second plurality of substantially orthogonal signals, each of the second plurality of substantially orthogonal signals having a phase corresponding to one of the plurality of phases; and an adder for summing each of the second plurality of substantially orthogonal signals having the same phase, to create a third plurality of substantially orthogonal signals.

* * * * *